United States Patent
Ericsson et al.

(10) Patent No.: US 6,175,328 B1
(45) Date of Patent: Jan. 16, 2001

(54) SURVEYING METHOD AND SURVEYING SYSTEM COMPRISING A RADIO NAVIGATION UNIT

(75) Inventors: Lars Ericsson; Leif Andersson, both of Täby (SE)

(73) Assignee: Spectra Precision AB (SE)

( * ) Notice: Under 35 U.S.C. 154(b), the term of this patent shall be extended for 0 days.

(21) Appl. No.: 09/402,258

(22) PCT Filed: Mar. 19, 1998

(86) PCT No.: PCT/SE98/00498

§ 371 Date: Nov. 15, 1999

§ 102(e) Date: Nov. 15, 1999

(87) PCT Pub. No.: WO98/44363

PCT Pub. Date: Oct. 8, 1998

(30) Foreign Application Priority Data

Apr. 1, 1997 (SE) .................................................. 9701186

(51) Int. Cl.[7] .................................................. H04B 7/185
(52) U.S. Cl. .............................. 342/357.08; 342/357.06; 342/357.17; 342/357.13
(58) Field of Search ........................ 342/357.06, 357.13, 342/357.08, 357.17; 701/213

(56) References Cited

U.S. PATENT DOCUMENTS

| | | |
|---|---|---|
| 5,233,357 | 8/1993 | Ingensand et al. . |
| 5,471,218 | 11/1995 | Talbot et al. . |
| 5,600,436 * | 2/1997 | Gudat ................................. 356/141.3 |
| 5,644,318 * | 7/1997 | Janky et al. .......................... 342/357 |
| 5,760,909 * | 6/1998 | Nichols ................................. 356/4.08 |
| 5,821,900 * | 10/1998 | Kishimoto ............................ 342/357 |
| 5,841,026 * | 11/1998 | Kirk et al. ......................... 73/178 R |
| 5,903,235 * | 5/1999 | Nichols ................................ 342/357 |

FOREIGN PATENT DOCUMENTS

| | | |
|---|---|---|
| 19635591A1 | 2/1996 | (DE) . |
| 0 481 307 A2 | 4/1991 | (EP) . |

* cited by examiner

Primary Examiner—Thomas H. Tarcza
Assistant Examiner—Dao L. Phan
(74) Attorney, Agent, or Firm—Killworth, Gottman Hagan & Schaeff, LLP

(57) ABSTRACT

A surveying system is presented comprising a surveying equipment and a radio navigation unit comprising a radio navigation antenna and a radio navigation receiver, both removably connectable both on the survey equipment and on a survey object. The object is provided with at least one target for the surveying equipment to be directed to. A removable panel co-operates with the radio navigation unit and with the survey equipment. The panel comprises a computer provided with a program system adapted for operating both the radio navigation receiver and the surveying equipment.

23 Claims, 2 Drawing Sheets

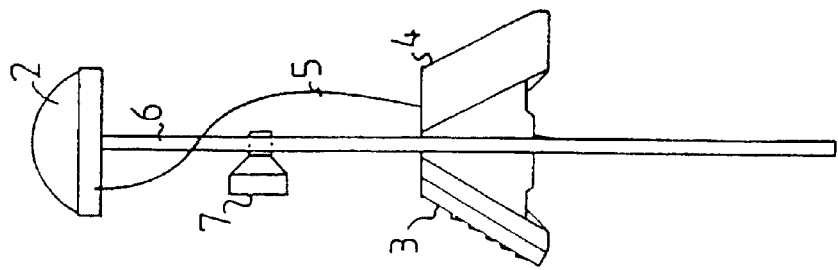
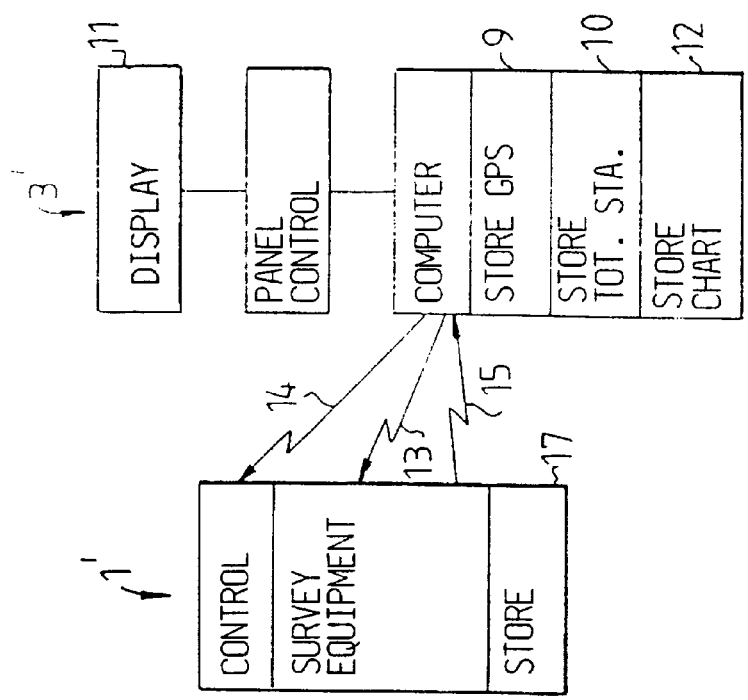
FIG. 2
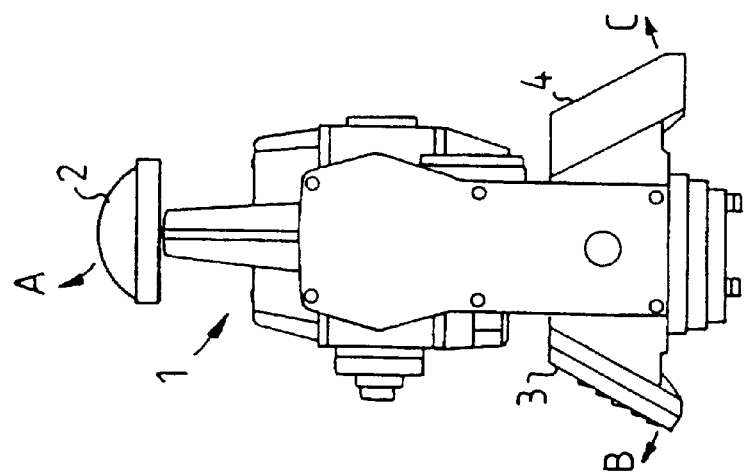

SURVEYING METHOD AND SURVEYING SYSTEM COMPRISING A RADIO NAVIGATION UNIT

This invention relates to a positioning system comprising an electronic surveying equipment, such as a total station, and at least one radio signal position measuring unit, for instance a GNSS (Global Navigation Satellite System), such as a GPS (Global Position Satellite), unit.

BACKGROUND OF THE INVENTION

An electronic surveying equipment comprises an integrated distance and angle measuring instrument, which electro-optically makes measurements towards a target, such as a reflector, for instance a cube corner prism or mirror arrangement or the like, and/or some other kind of active target that the station can lock on. In the recent years such instruments have become modular such that a customer has been able to buy a base equipment and then complete it with extra features later on.

There are known systems having a combination of a surveying equipment and a radio signal position-measuring equipment, below called GPS for simplicity reasons.

U.S. Pat. No. 5,233,357 discloses a terrestrial surveying system comprising an electronic surveying equipment and at least one portable position-measuring unit equipped with a GPS antenna. The disclosed system requires that two persons perform the surveying, one standing at the surveying equipment and the other at the plumb rod having the GPS antenna. The surveying equipment is provided with a computer. The GPS system transmits position data wirelessly to the surveying equipment to be processed in its computer. The person standing at the surveying equipment makes measurements towards the plumb rod having the GPS antenna in the case that the rod is placed where the GPS antenna has a bad or no view of the GPS satellites.

OBJECTS OF THE INVENTION

An object of the invention is to provide a surveying system able to be operated by only one person who transports a measuring rod or some other measuring object to the points to be measured.

Another object of the invention is to provide a surveying system operable by a single person for placing measuring points at predetermined places on the ground or positioning some object, such as a rail, a ship or the like, along a predetermined path.

Still another object of the invention is to provide a surveying system comprising a surveying equipment with means for determination of the horizontal reference direction without the use of so called "backwards objects" having known predetermined positions, such as church towers or the like, for its orientation.

SUMMARY OF THE INVENTION

A solution to the objects of the invention is disclosed in the characterising parts of the independent claims. Further features and developments of the invention are disclosed in the dependent claims.

ADVANTAGES OF THE INVENTION

The surveying equipment needs no equipment providing a reference to north nor the use of predetermined position data of points in the surroundings towards which the instrument has to be directed before measurement.

The operator has full freedom to either make measurements by using the surveying equipment, such as a total station, in a conventional way and/or to make measurements by using the radio navigation system, such as the GPS, whichever is best adapted to the actual measuring point.

It is a great business advantage to give the opportunity for a customer only to buy a surveying equipment and to have the possibility to add GPS measurements later on. Thus, the surveying equipment is always prepared for GPS and an addition could be made when needed.

The operator standing at the measuring point can remotedly order the surveying equipment to search for the measuring rod and lock on it, make registrations of measurements taken either by the surveying equipment or by the GPS unit without transmitting position data to the surveying equipment.

BRIEF DESCRIPTION OF THE DRAWINGS

The invention will now be described in more detail in form of examples only with reference to the accompanying drawings, in which FIG. 2 illustrates a second embodiment of the system according to the invention.

Referring to FIG. 1, a surveying equipment 1, for instance a total station manufactured by GEOTRONICS AB, is provided with a mounting onto which a GPS antenna 2 (or an antenna for some other radio navigation system) can be releasably mounted. This mounting can be an upper handle of the surveying equipment. The GPS antenna 2 is connected to a GPS receiver 4, which preferably is removable. The surveying equipment is provided with a removable panel unit 3 comprising computing means 3'. This panel unit 3 is a part of the system which can be optionally attached to an ordinary total station.

Figure 1:
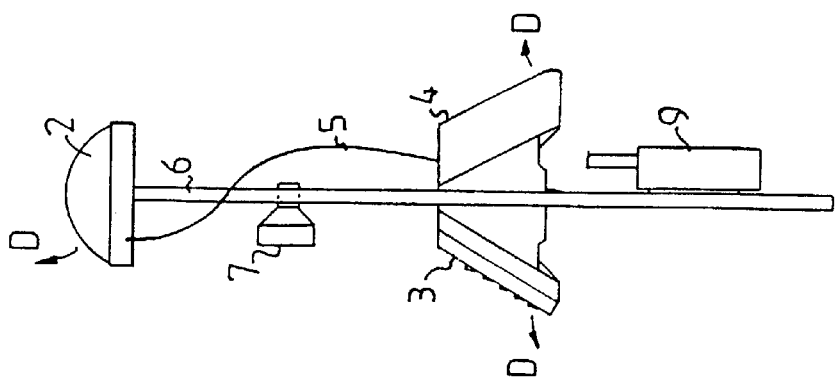
FIG. 1 illustrates a first embodiment of the system according to the invention.
Figure 1:
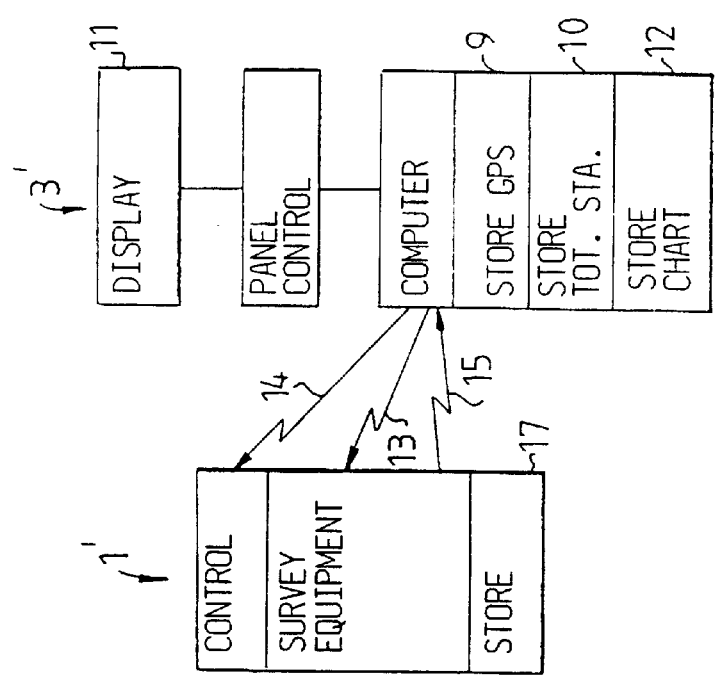
Figure 1:
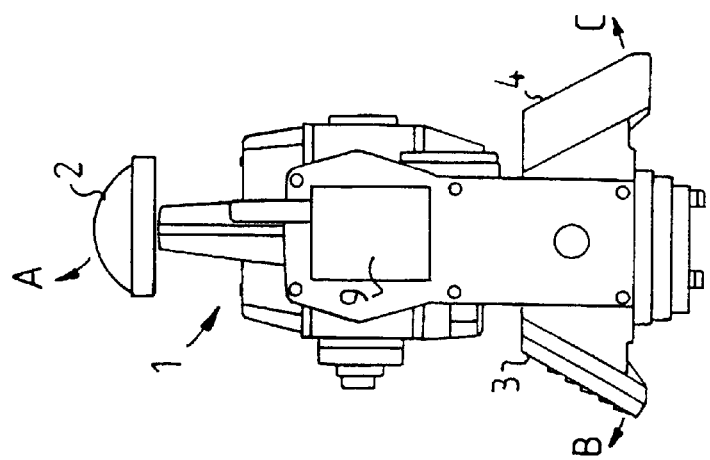

The panel 3 is intended to be plugged into the surveying equipment 1 when the GPS unit 2,4 is used on the surveying equipment. The panel 3 comprises a computing unit and storage means 9, 10, 12 for storing data, as illustrated as the block 3' in FIG. 1.

The removable panel unit 3 is adapted to co-operate with both the GPS receiver 4 and the surveying equipment 1 at will and comprises a computer provided with a program system adapted for both the GPS receiver and the surveying equipment.

The surveying equipment 1 is placed at an appropriate point on the ground. A reference station for GPS differential measurements (not shown) is situated at a spot known per se. This reference station could be a base station provided by the local district or any other kind of station, for instance a station centrally placed on a point having a known position.

Before any measurements of measuring points in the surroundings are started the co-ordinates (x0,y0,z0) for the surveying equipment 1 are determined by GPS data for the surveying equipment having the GPS antenna mounted on the mounting, and the panel 3 placed at the station.

In order to be able to use the surveying equipment 1 for providing positions of measuring points not only must its position be known but also its reference direction in a horizontal plane determining the direction of the surveying equipment in relation to north. In the prior art, reference measurements had to be taken at points in the vicinity having priorly known positions, such as church towers or the like. In the inventive system the surveying equipment will be provided with a reference horizontal direction using the GPS equipment without the need for such reference measurements. Then the reference GPS-station is used in differential measurements in order to provide exact position data for the GPS-equipment. The horizontal reference direction of the surveying equipment 1 is found by the following steps:

1. placing the radio navigation unit at and measuring the position of the surveying equipment 1 and storing the surveying equipment position in a store in the panel means 3;
2. placing the radio navigation unit and the panel means 3 on the surveying object 6 and placing the surveying object 6 at a reference point;
3. measuring the reference position of the surveying object 6 and storing the measured position in the panel means;
4. calculating at least the angular horizontal direction between the positions of the surveying equipment and the reference position;
5. directing the surveying equipment towards the object 6, comparing the calculated angular horizontal direction and the actual angular horizontal direction,
6. storing the difference for later correction of measured horizontal angles, whereby the steps 1 and 2,3 and can change place with each other.

When measurements to different measuring points in the area are to be done the GPS antenna 2, the GPS receiver 4, and the master panel unit 3 are removed from the surveying equipment 1, as illustrated by the arrows A, B and C, and placed on a measuring rod 6 (or other device to which measurements could be made, like a vehicle of some kind) having a target unit 7, such as a reflector or some other active target for the survey equipment to lock on, and towards which the survey equipment will make its measurements. However, it is to be noted that the GPS antenna and receiver instead could be doubled and fixed on the surveying equipment and on the surveying object 6. Then only the panel 3 is releasable and movable between these elements and connectable to the total station and to the fixed GPS equipment on both the survey equipment and survey object.

It is to be noted that the "zero point" of the GPS antenna ought to be centerd with the "zero point" of the target on the rod such that the phase center of the GPS antenna coincides with the point on the target onto which the survey equipment locks or is pointed to (zero point). Normally, the "zero point" of the target is coincident with the center line of the rod 6. An offset between the antenna phase center and the target center with respect to the rod rotational axis involves an uncertainty as regards the position unless the rotational angle of the rod around its center axis is exactly known. Therefore, both the target and the GPS antenna means of attachment ought to be constrainedly centered on the rod.

Also, the GPS antenna ought to have its phase center on the vertical rotational axis of the surveying equipment when placed there. Thus, the GPS antenna should be placed on a constrainedly centerd means of attachment.

However, it is easy to correct for the necessary offset in vertical direction between the GPS antenna and the reflector on the rod an between the GPS antenna and the measuring equipment of the surveying equipment 1, respectively.

After measuring of the position of the surveying equipment and placing the panel 3 on the measuring rod 6, the rod is moved to a suitable reference measuring point (x1,y1,z1) easily reachable for the surveying equipment 1 and not hidden from the GPS satellites to be used by the GPS antenna. From the GPS unit the co-ordinates of the reference point (x1,y1,z1) are provided. The computing unit 3' in the panel 3 then calculates the vector (x0,y0,z0)-(x1,y1,z1) giving the direction from the surveying equipment 1 to the reference measuring point. This direction data is preferably transmitted to the surveying equipment 1, thereby providing its reference horizontal direction, as illustrated by the arrow 13.

In the embodiment shown in FIG. 1 the surveying equipment 1 is of a kind which by itself, on remote order from the operator standing at the measuring rod 6, can search for and lock onto the target 7 on the rod 6. This feature is common in the art and therefore not described in further detail. One such system is disclosed in U.S. Pat. No. 5,323,409.

The rod 6 (or other object) is thus provided with a transceiver unit 8 for sending an order signal. The surveying equipment 1 is provided with a transceiver unit 9 which reacts to the order signal by starting the search and locking procedure, as illustrated by the arrow 14. When the surveying equipment 1 is locked on the target 7 it measures the distance to it and also its vertical and horizontal directional angles. It should be noted that the horizontal reference for the surveying equipment 1 has not yet been determined.

Data for the rod point is thus measured by both the GPS unit and the surveying equipment 1. Thus the azimuth calculated from the GPS measurements may now be used to define the reference angle at the surveying equipment. This reference angle could be transmitted to the surveying equipment from the GPS unit on the rod, for instance via radio or an IR-beam or the like, as illustrated by the arrow 13, or it is possible to make a correction for the divergence between the angle measured by the surveying equipment and the known azimuth in the panel 3.

The operator could then move the rod to appropriate measuring points and choose whether the measuring point in question should be measured by GPS and/or by the surveying equipment 1 and sent over to the panel as illustrated by the arrow 15. In any case the measuring values are stored in a store 9 for GPS measurements or in a store 10 for surveying equipment measurements, respectively, in the computer 3' belonging to the panel 3. The operator can observe the actual available data on a display 11 on the panel 3. It is also possible to have the measurements measured by the survey equipment stored in a store 17 in the equipment for transfer to the panel when it is released from the surveying object and connected to the survey equipment later on.

Appropriate surveying set points or paths to which actual measuring points are to be compared and positioned could also be stored in a surveying chart store 12 in the computer 3' in the panel 3 before a series of measurements are started and later shown on the display 11. This storage is preferably done at the office from a computer, in which all the data for the actual surveying to be done have been calculated, before the operator departs for the area for the actual surveying. The operator could thus then be guided to each set point or path by measurements provided by the GPS or by the surveying equipment being constantly locked onto and following the target when the surveying object is moved.

If the operator chooses to use only the GPS unit during several measurements to measuring points and then wants to have a measurement made by the surveying equipment 1 the operator can order the surveying equipment to search and lock to the target on the rod 6 and then make the distance and angle measurements. The data can be transmitted to the panel 3 on the rod where the position is calculated and stored in its computer and shown on the display for guiding the operator. Thus, all guiding and computing needed for the surveying is done in the computer in the panel 3.

The measuring method described above is a method that a single operator could easily manage. A prerequisite for this method is that the surveying equipment is provided with a servo system for following the movement of the rod and a unit making it possible to be locked on to the target on the rod. Units are provided for wireless data transmission between the surveying equipment and the rod. The measurement procedure is, in brief:

a. Mount the GPS units (receiver and antenna) and the panel 3 on the surveying equipment 1. Measure its position using GPS and store it in the panel.
b. Mount the GPS units and the antenna onto the rod 6. Measure the rod position using GPS and store it in the panel 3.
c. Order the surveying equipment (wirelessly) to search for target on the rod, lock onto it and follow it. Thereafter, its reference horizontal angular position can be set, since the direction is known from GPS data. The reference angle can either be transmitted to the station (wirelessly) or the angular displacement can be compensated for in the panel 3.
d. Continued measurements can then be done by GPS equipment and/or by the surveying equipment 1, whatever is best suited for the actual measuring point in question. When the horizontal reference direction is determined, searching for the reflector by the surveying equipment can be eased by directional information from the panel 3. Data (distance and horizontal and vertical angular directions) is transmitted from the surveying equipment to the panel 3 on the rod 6. The actual position of the rod is calculated and displayed on the display 11.

In order to speed up the searching procedure the panel 3, when mounted at the rod 6, could send direction information data to the surveying equipment 1 from which the surveying equipment can begin its searching operation. The position of the rod may then be hidden from the GPS satellites. An earlier measured position in the vicinity of the present position may therefore be chosen by the operator. The direction between the surveying equipment 1 and the rod 6 could be calculated and sent to the surveying equipment 1, (arrow 13) at need as the direction from which its searching should start from.

Another possibility is that, particularly when the rod is moved so that the sight between the surveying equipment 1 and the prisms on the rod 6 is lost, the GPS equipment on the rod could measure the position of the rod, calculate the direction between the surveying equipment 1 and the rod 6, and send the direction data to the surveying equipment. The surveying equipment would then be controlled to be directed in the calculated direction. This could be done continuously, updated at the rate determined by the measuring and calculating rate of the GPS equipment. The surveying equipment 1 could in this way be kept directed to the rod 6 to follow its movements even when its view of the rod is obstructed.

This above procedure can be done stepwise for each updating measurement, but it can also follow the movements of the rod in a smooth angular movement calculated from the last angular position calculation and earlier calculations, its actual angular position being updated at each measurement and calculation by the GPS equipment. This will make the position measurements very fast and precise.

It is also possible to make measurements to an object continuously and also automatically by having, for instance, both the GPS equipment and the surveying equipment make measurements at the same time for the same measuring point at intervals only determined by the measuring rate for each kind of station.

After the end of a measuring sequence the two kinds of measurements for each measuring point are compared with each other. One of the measurements could then be rejected, particularly if the results of that kind of measurement have been distorted. Otherwise, a weighted average value of the two kinds of measurements (GPS and Surveying equipment) could be calculated.

As illustrated in FIG. 2 it is also possible to use a surveying equipment 1 without the possibility to automatically search for and lock to a target. In this case, the operator takes the rod or some other surveying object provided with the GPS antenna, its receiver and panel 3 to a reference measuring point. The operator makes the measurement using the GPS equipment. The position data (x,y,z) of the reference point is stored in the panel. Thereafter, the operator removes the panel and GPS unit from the rod, as illustrated by the arrow D, and takes them to the surveying equipment 1. He plugs the panel 3 onto the surveying equipment 1, connects them to the same, and determines its position (x0,y0,z0) by GPS measurements.

He then directs the surveying equipment 1 towards the measuring reflector 7 on the rod 6 and collects the reference angle for this direction from the panel, i.e. the direction of the surveying equipment corresponds with the computed vector (x0,y0,z0)-(x1,y1,z1). Thus, no reference measurements towards known points in the environment need be done in this embodiment.

From now on the surveying equipment 1 is able to make measurements to measuring points and provide their position co-ordinates.

Thus, no servo system and no wireless transmission is needed in the system shown in FIG. 2. The measurement procedure is, in brief:

a. Place the GPS unit and the panel 3 onto the rod 6. Move the rod to a reference measuring point. Measure the rod position using GPS. Store the data in the panel.
b. Leave the rod in the reference measuring point. Move the panel and the GPS unit 2,4 to the surveying equipment. Direct the surveying equipment towards the target (reflector) on the rod manually. The reference horizontal angle is calculated using GPS data.
c. Measurements of measuring points can thereafter be done in a conventional way from the surveying equipment 1. This requires that someone or something moves the rod to the setting out points.

While the invention has been described with reference to specific embodiments, it will be understood by those skilled in the art that various changes may be made and equivalents may be substituted for elements thereof without departing from the invention as stated in the claims. For instance the removable panel could be connected to a separate GPS receiver but it could also comprise the GPS receiver as an integrated part. A device to which measurements could be made other than a rod could be provided, such as a vehicle to be moved along a path of some kind, a person or an animal to be followed, or the like. Both the surveying equipment and the rod could have a permanently seated GPS antenna. This could be due also for the GPS receiver.

We claim:

1. A survey system comprising a survey equipment; a survey object having a target for the surveying equipment to be directed to; at least one radio navigation unit comprising a radio navigation antenna and a radio navigation receiver, the at least one radio navigation unit connectable both to the surveying equipment and to the surveying object; and a panel adapted to be mountable and removable at, and co-operate with, the at least one radio navigation unit and with the surveying equipment, said panel comprising a computer provided with a program system adapted for contacting both the radio navigation receiver and the survey equipment.

2. A survey system according to claim 1, characterized in that the program system is adapted to provide a radio navigation reference direction for the survey equipment from a radio navigation measurement of the position of the surveying equipment and a radio navigation measurement of the surveying object when positioned at a reference measuring point.

3. A surveying system according to claim 2, characterized by comparing means for comparing the actual internal directional value of the surveying equipment with the radio navigation reference direction;

storing means for storing the difference; and correcting means for correcting later horizontal angles measurements.

4. A surveying system according to claim 1, characterized by means to compute the actual direction between the survey equipment and the surveying object and transfer it to the surveying equipment; directional means at the surveying equipment to set the equipment in the computed direction.

5. A surveying system according to claim 1, characterized in that the surveying equipment is provided with a transmitter for sending data to the panel when the panel is provided on the surveying object, whereby said data concerning the position of the object measured by the surveying equipment is stored in the panel.

6. A surveying system according to claim 1, characterized in that the programming system is adapted to store set out data information for an operator and that the panel has a display showing data for guiding the surveying object to actual measuring points or paths adapted to predetermined set out points or paths.

7. A surveying system according to claim 1, characterized by transmitting means at the survey object for ordering the surveying equipment to search for and lock onto the surveying object.

8. A surveying system according to claim 1, where the surveying object is a measuring rod, and characterized by attachment means for centering the phase center of the radio navigation antenna and the center point of the target to the rod axis.

9. A surveying system according to claim 1, characterized by attachment means for centering the phase center of the radio navigation antenna with the vertical rotation axis of the surveying equipment when the antenna is placed there.

10. A surveying system according to claim 1, characterized in that the at least one radio navigation unit is a GPS-equipment.

11. A surveying method comprising the steps of using a surveying equipment; using a surveying object having at least one target for the surveying equipment to be directed towards; providing at least one radio navigation unit comprising a radio navigation antenna and a radio navigation receiver, the at least one radio navigation unit connectable both to the survey equipment and to the survey object; providing a computer having a program system adapted for both operating the radio navigation receiver and the survey equipment, wherein the computer is provided in a mountable and releasable panel; moving and connecting the panel releasably between the surveying equipment and the at least one radio navigation unit; and storing information of measured positions of the surveying object.

12. A surveying method according to claim 11, wherein the step of storing information is further characterized by writing information into the computer in the releasable panel regarding a survey operation for a survey area; presenting measured position information; and guiding an operator situated at the surveying object.

13. A surveying method according to claim 11, further characterized by the step of determining a horizontal reference direction of the surveying equipment by:

1. placing the at least one radio navigation unit at, and measuring the position of the surveying equipment and storing the surveying equipment position in a store in the panel;
2. placing the at least one radio navigation unit and the panel on the surveying object and placing the surveying object at a reference point;
3. measuring the reference position of the surveying object and storing the measured position in the panel;
4. calculating at least the angular horizontal direction between the positions of the surveying equipment and the reference position;
5. directing the surveying equipment towards the object, comparing the calculated angular horizontal direction and the actual angular horizontal direction,
6. storing the difference for later correction of measured horizontal angles, whereby the steps 1 and 2,3 and can change place with each other.

14. A surveying method according to claim 11, wherein the step of using a surveying equipment is further characterized by the step of using a surveying equipment having an automatic function for searching and being directed to the surveying object, characterized by calculating the actual directional angle for the surveying equipment to be directed to the surveying object for measuring points measured by the at least one radio navigation unit, transmitting the actual directional angle to the surveying equipment at least as a starting direction for searching the actual position of the object.

15. A surveying method according to claim 11, further characterized by the step of centering the phase center of the radio navigation antenna with the center point of the target on the surveying object at least in vertical direction.

16. A surveying method according to claim 11, further characterized by the step of centering the phase center of the radio navigation antenna with the vertical rotation axis of the surveying equipment when the antenna is placed there.

17. A survey method according to claim 11, further characterized by the step of computing and sending direction information data to the surveying equipment from the panel for an actual measuring point, adjusting the direction of the surveying equipment, beginning its searching operation from the adjusted direction.

18. A surveying method according to claim 11, further characterized by the step of continuously calculating the position of the surveying object and of the direction between the surveying equipment and the surveying object;

transmitting the calculated direction to the surveying equipment;

directing the surveying equipment along the calculated direction continuously, updated in the rate determined by the measuring and calculating rate of the radio navigation equipment.

19. A surveying method according to claim 11 characterized in that the step of providing at least one radio navigation unit further comprises the step of providing at least one GPS-equipment radio navigation unit.

20. A survey system according to claim 1, wherein said target comprises a reflector.

21. A survey system according to claim 1, wherein said target comprises an active target.

22. A survey system according to claim 1, wherein said target comprises a reflector and an active target.

23. A surveying method according to claim 11, wherein said target comprises a reflector.

* * * * *